June 13, 1967  G. D. CLUGSTON  3,324,833
CATTLE FEEDER
Filed Oct. 12, 1965
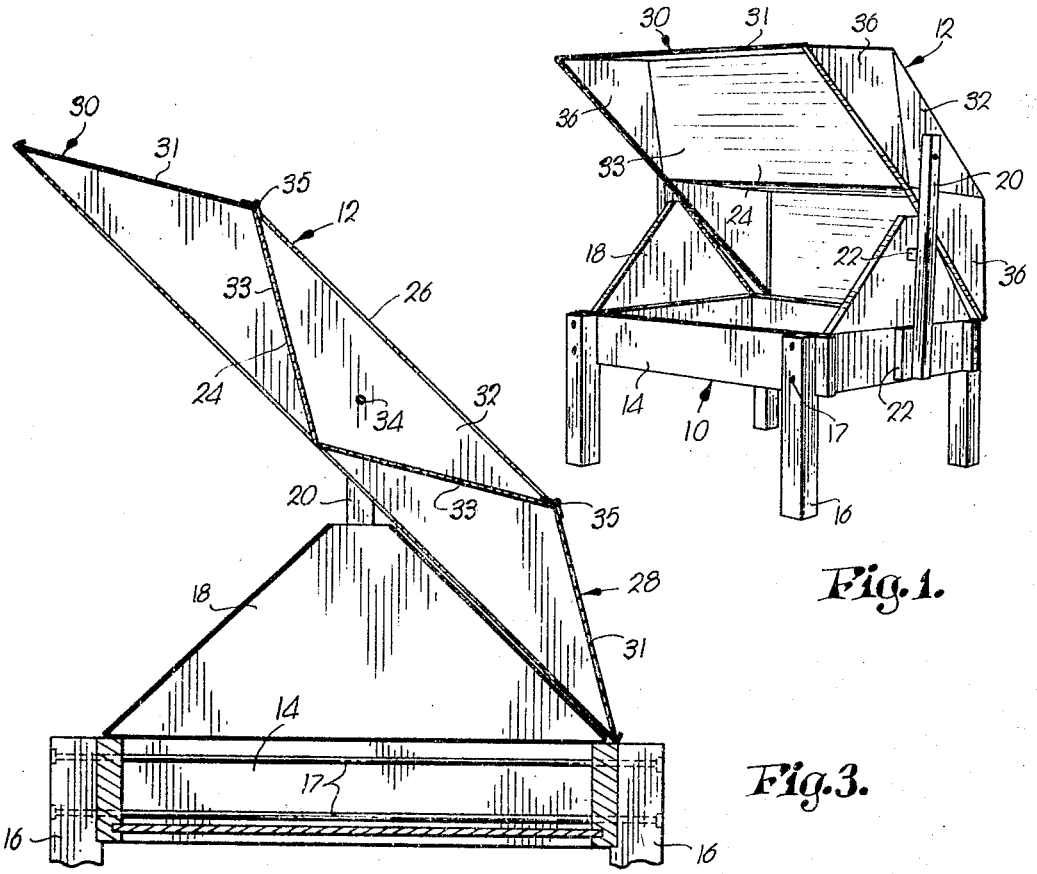
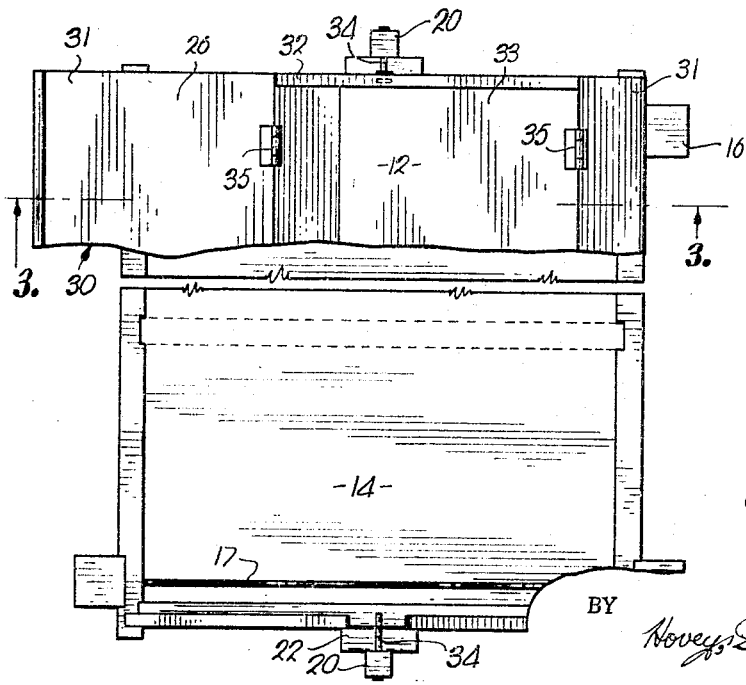
INVENTOR
George D. Clugston
BY
ATTORNEYS.

3,324,833
CATTLE FEEDER
George D. Clugston, 703 E. Quincy,
Pittsburg, Kans. 66762
Filed Oct. 12, 1965, Ser. No. 495,054
9 Claims. (Cl. 119—51)

This invention relates to livestock feeding equipment and, more particularly, to a cattle feeder which shields cattle from the wind as they are eating.

It is the primary object of my invention to provide a cattle feeder having a cover for shielding cattle or other livestock from the wind as they are eating, the novel feature being that the cover automatically changes position to continually shield the livestock from the wind, irrespective of the particular wind direction.

A further object of the invention is to provide a cattle feeder as above described wherein the livestock may feed without being subjected to bothersome wind currents, and also the minerals, salt, food and the like in the feeder will be available at all times in all types of weather and will not be blown away and wasted nor blown into the faces of the animals because of the novel reversing cover.

A more particular object of this invention is to provide a cattle feeder of the aforementioned character wherein a swingable, inclined cover is carried over a feeder trough in such a manner that when wind strikes the back or outer surface of the cover it will be retained in a shielding position with respect to livestock eating from the trough, but when wind strikes the inner surface of the cover, it will pivot to shield the livestock as the latter feed from the other side of the trough.

An important object of the instant invention is to provide a cattle feeder having a windshielding cover which is aerodynamically designed to most effectively take advantage of the force of the wind and thereby assure optimum operation. In this regard, it will be noted that a stronger wind force is necessary to move the cover to a new position than to merely retain the cover in its original position, and thus the cover of the instant invention is designed to most effectively harness the wind force when it is most needed.

Another object of this invention is to provide a cattle feeder as above described wherein the cover is provided with swing-away parts which lessen the impact of the cover against the livestock if they are feeding when the cover changes position in response to a wind direction variation.

In the drawing:

FIGURE 1 is perspective view of a cattle feeder made pursuant to the teachings of my invention;

FIG. 2 is an enlarged, fragmentary, top plan view, parts thereof being broken away to reveal details of construction; and FIG. 3 is a cross-sectional view taken along line 3—3 of FIG. 2.

The cattle feeder of the present invention broadly comprises a base 10 swingably carrying a hood or cover 12. Base 10 includes a substantially rectangular trough 14 supported at the corners thereof by legs 16. It will be noted that the legs are suitably notched and the trough grooved so that the base can be easily assembled with only four bolts 17 being required.

A pair of triangularly-shaped side boards 18 extend upwardly from the opposed ends of trough 14 and serve as secondary windshields. A pair of opposed uprights 20 are provided on each end of the trough and are mounted thereon in spaced relationship by blocks 22.

Cover 12 has an inner surface 24 and an outer surface 26 and comprises a pair of sections 28 and 30 which are V-shaped in transverse cross-sectional configuration. Sections 28 and 30 each comprise a pair of transversely extending planar stretches 31 and 33, the stretches of each section being joined by pivot structure in the form of hinges 35. A pair of triangularly-shaped side plates 36 are secured to the opposed ends of each stretch 33 and the corresponding stretches 31 normally rest on the outer free edges of respective side plates 36.

Sections 28 and 30 are joined at the adjacent ends thereof by a pair of gusset members 32. Cover 12 is disposed between uprights 20 and a shaft 34 extends through uprights 20 and the adjacent portions of gussets 32 to serve as a pivot axis for cover 12, the axis being centrally located with respect to sections 28 and 30.

It will be noted that when cover 12 is in an inclined position as shown in the drawing, a greater area of the cover is disposed below shaft 34 than is disposed thereabove. This may be easily recognized by the fact that all of section 28 is disposed below shaft 34 in addition to a portion of section 30.

In use, when wind strikes the outer surface 26 of cover 12, a greater amount of wind force will be directed against cover 12 below shaft 34 than that directed above the same. Wind striking the outer surface 26 of cover 12 will, therefore, tend to rotate the cover clockwise, as viewed in FIG. 3 of the drawing, but will be prevented from rotating because section 28 engages trough 14 and side boards 18. Thus, cover 12 will be retained in this inclined position and shield livestock feeding from the open side of trough 14.

Conversely, when wind strikes the inner surface 24 of cover 12, it will tend to rotate the cover counterclockwise about shaft 34, and since there is no resistance to movement of cover 12 it will swing to a second inclined position directly opposed to its original position. If an animal is feeding when the cover swings into a new position, the uppermost stretch 31 of section 30 will strike the animal, but the impact will be minimized as stretch 31 will swing upwardly about hinge 35 with respect to its adjacent stretch 33 and thus the full impact of the swinging cover will not be imparted to the animal.

It will be appreciated that since the feeder is substantially symmetrical, the swinging movement of cover 12 and also of stretches 31 will be identical irrespective of the particular original inclined position of the cover.

It is noteworthy that the inner surface 24 of cover 12 is comprised of generally concave surfaces as defined by the stretches 31 and 33 which are disposed in angular relationship. As will be appreciated, a greater force of wind is necessary to swing cover 12 to its alternate position than to merely retain the cover in a stable position. Thus, the generally concave sections of the cover are aerodynamicaly designed so that they most effectively collect the wind when it blows against the inner surface 24 to swing the cover. The generally convex, outer surfaces of the sections are not as effective in collecting the wind, but as previously mentioned, less wind force is required to merely maintain the cover in position as the wind blows against the outer surface 26 thereof.

The relative size of the feeder is, of course, optional and may be designed for use with many types of animals, including greyhounds and other kennel animals.

Having thus described the invention, what is claimed as new and desired to be secured by Letters Patent is:

1. A cattle feeder comprising:
   a base;
   a cover; and
   mounting means swingably attaching the cover to the base for swinging of the cover about a horizontal axis between opposed first and second vertically inclined positions, said axis being intermediate the ends of the cover, with a greater area of the cover normally disposed below said axis than disposed thereabove, said cover comprising a first section and a second section, said sections being joined adjacent said axis, the said greater area of the cover including all of said first section and a part of said second section, said cover thereby selectively swinging to said positions in response to wind acting thereon, there being structure connecting at least a portion of said second section to said first section to normally hold said portion in said first inclined position, said structure including pivot means coupled between said first section and said portion so that the latter will swing upwardly with respect to said first section when the portion encounters an obstruction as the cover swings to its second inclined position.

2. A cattle feeder comprising:
a base;
a cover; and
mounting means swingably attaching the cover to the base for swinging of the cover about a horizontal axis between opposed first and second vertically inclined positions, said axis being intermediate the ends of the cover, with a greater area of the cover normally disposed below said axis than disposed thereabove, said cover comprising a first section and a second section, said sections being joined adjacent said axis, the said greater area of the cover including all of said first section and a part of said second section, said cover thereby selectively swinging to said positions in response to wind acting thereon, each of said sections comprising a pair of transversely extending stretches and structure interconnecting said stretches to hold the same in relative angular relationship to each other when said cover is in said first inclined position, said structure including pivot means interconnecting the stretches so that the normally uppermost stretch will swing upwardly with respect to its adjacent stretch when the uppermost section encounters an obstruction as the cover swings to its second inclined position.

3. A cattle feeder comprising:
a base;
a cover for the base; and
mounting means swingably attaching said cover on the base for swinging of the cover about a horizontal axis, the axis of swinging movement of the cover being intermediate the ends thereof, said cover having an inner and outer surface, said base including means limiting the path of swinging of said cover between opposed vertically inclined positions wherein a greater surface area of the cover is disposed below said axis than is disposed thereabove, whereby wind acting against the outer surface of the cover will retain the same in one of said positions and wind acting against the inner surface of the cover will swing the same about said axis to the other of said positions.

4. Apparatus as set forth in claim 3, wherein said cover comprises a first section and a second section, said sections being joined adjacent said axis of swinging movement, the said greater area of the cover including all of said first section and a portion of said second section.

5. Apparatus as set forth in claim 4, each section including a pair of transversely extending stretches and structure pivotally interconnecting the stretches for yielding of the corresponding outer stretch when the latter encounters an obstruction as the cover swings from one inclined position to the other.

6. Apparatus as set forth in claim 4, wherein the inner surface of each of said sections is generally concave in configuration.

7. Apparatus as set forth in claim 6, wherein each of said sections comprises a pair of interconnected, transversely extending planar stretches disposed in angular relationship to each other to define said general concave configuration.

8. Apparatus as set forth in claim 3, said base including a trough and a pair of opposed uprights, said mounting means including shaft means coupled to said uprights, said cover being received on said shaft means for free swinging thereabout.

9. Apparatus as set forth in claim 8, said cover comprising a first section and a second section each having a generally concave inner surface, said sections being joined adjacent said axis of swinging movement, the said greater area of the cover including all of said first section and a portion of said second section.

References Cited

UNITED STATES PATENTS

| 725,162 | 4/1903 | Smith | 119—63 |
| 1,462,751 | 7/1923 | Huntington | 119—61 |
| 2,545,105 | 3/1951 | Niskala et al. | 119—61 |
| 2,709,988 | 6/1955 | Hatcher | 119—62 |

FOREIGN PATENTS 350,312  6/1931  Great Britain.

SAMUEL KOREN, *Primary Examiner.*

HUGH R. CHAMBLEE, *Examiner.*